US010459327B2

(12) United States Patent
Irzyk et al.

(10) Patent No.: US 10,459,327 B2
(45) Date of Patent: Oct. 29, 2019

(54) COMPACT VEHICLE HEAD-UP DISPLAY

(71) Applicant: VALEO COMFORT AND DRIVING ASSISTANCE, Créteil (FR)

(72) Inventors: Michael Irzyk, Creteil (FR); Pierre Mermillod, Créteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 0 days.

(21) Appl. No.: 15/747,615

(22) PCT Filed: Jul. 27, 2016

(86) PCT No.: PCT/EP2016/067962
§ 371 (c)(1),
(2) Date: Jan. 25, 2018

(87) PCT Pub. No.: WO2017/017162
PCT Pub. Date: Feb. 2, 2017

(65) Prior Publication Data

US 2018/0217488 A1 Aug. 2, 2018

(30) Foreign Application Priority Data

Jul. 27, 2015 (FR) ...................................... 15 57154

(51) Int. Cl.
*G03B 21/20* (2006.01)
*G03B 21/28* (2006.01)
(Continued)

(52) U.S. Cl.
CPC ........... *G03B 21/28* (2013.01); *G02B 5/0257* (2013.01); *G02B 27/0101* (2013.01); *G02B 27/0103* (2013.01); *G02B 2027/0118* (2013.01)

(58) Field of Classification Search
CPC .. G03B 21/28; G02B 5/0257; G02B 27/0101; G02B 27/0103; G02B 2027/0118
See application file for complete search history.

(56) References Cited

U.S. PATENT DOCUMENTS 5,249,081 A * 9/1993 Rogers ..................... G02B 5/04 359/633
5,278,695 A * 1/1994 Gebelein ................... B60R 1/10 359/419

(Continued)

OTHER PUBLICATIONS

International Search Report issued in PCT/EP2016/067962 dated Sep. 27, 2016 (2 pages).

(Continued)

*Primary Examiner* — Sultan Chowdhury
*Assistant Examiner* — Magda Cruz
(74) *Attorney, Agent, or Firm* — Osha Liang LLP

(57) ABSTRACT

A compact head-up display for a vehicle includes: an image generator that displays an image on a display surface, and a semi-reflecting optical element, arranged at a distance from the image generator, that forms, on a first side of the optical element, a virtual image. The virtual image is visible from a viewing window on a second side of the optical element. The display includes an optical component that lengthens the optical path of the image passing from the image generator to the optical element. The optical component includes one entry face and one exit face, and a first reflecting face and a second reflecting face. The first reflecting face reflects the image from the entry face toward the second reflecting face. The second reflecting face reflects the image from the first reflecting face toward the exit face. The entry face is in contact with the display surface.

13 Claims, 2 Drawing Sheets

Figure 1:
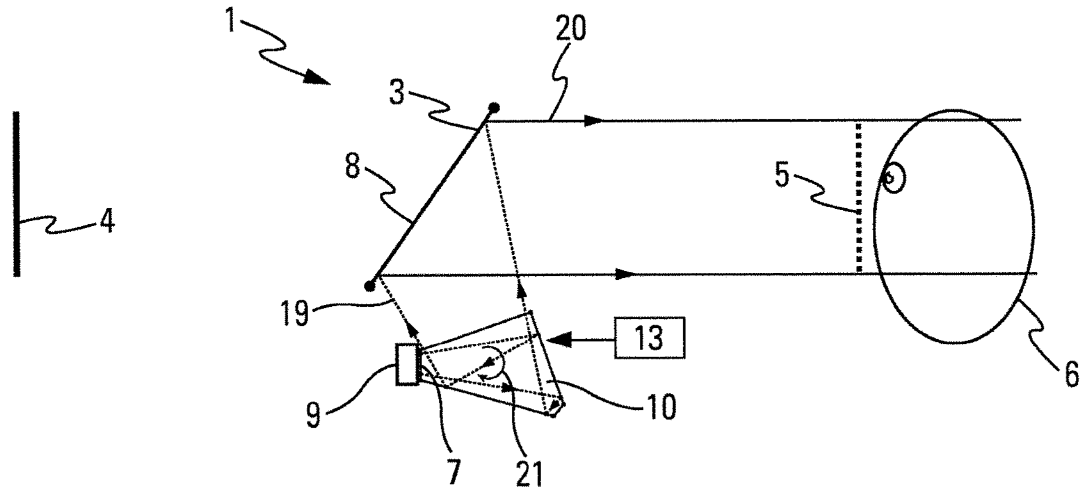

(51) Int. Cl.
*G02B 27/01* (2006.01)
*G02B 5/02* (2006.01)

(56) References Cited

U.S. PATENT DOCUMENTS

| | | | | |
|---|---|---|---|---|
| 9,551,867 | B1 * | 1/2017 | Grabowski | G01C 21/365 |
| 2002/0085281 | A1 * | 7/2002 | Dubin | G02B 27/283 359/485.01 |
| 2005/0180021 | A1 * | 8/2005 | Travers | G02B 27/0172 359/630 |
| 2011/0051029 | A1 * | 3/2011 | Okumura | G03B 21/28 349/57 |
| 2011/0134498 | A1 * | 6/2011 | Ohta | G02B 27/01 359/200.7 |
| 2011/0157707 | A1 | 6/2011 | Tilleman et al. | |
| 2011/0235185 | A1 * | 9/2011 | Kanamori | G02B 27/01 359/630 |
| 2014/0268358 | A1 | 9/2014 | Kusaka et al. | |
| 2017/0115485 | A1 * | 4/2017 | Saito | B60K 35/00 |

OTHER PUBLICATIONS

Written Opinion of the International Searching Authority issued in PCT/EP2016/067962 dated Sep. 27, 2016 (6 pages).

* cited by examiner

COMPACT VEHICLE HEAD-UP DISPLAY

The present invention relates to a compact head-up display, notably for an automobile vehicle.

The function of head-up displays is, generally speaking, to superpose information to assist piloting, navigation or the achievement of the mission, in the field of view of an aircraft pilot, for example. It thus allows the pilot to observe his/her environment at the same time as reading information supplied by his/her onboard instruments. Today, these displays are also used in the automobile sector.

Such devices comprise an image generator and a semi-reflecting optical element configured for forming a virtual image of the image of the generator. The virtual image is superposed on the environment in the field of view of the driver or of the pilot. It is also possible to use the windshield of the vehicle as the semi-reflecting optical element forming the virtual image. The technical characteristics of such a device notably relate to the position of the optical element with respect to the road and to the driver, and also to the angle of incidence of the image on the optical element, in order notably to avoid problems of distortion.

The image generators known in the automobile industry, comprise one or more light sources and a pixelization matrix which receives the light beam from the sources. The matrix transmits or reflects the light beam imprinting an image which is formed by virtue of the pixels. Each pixel is controlled individually, and may have either a position referred to as "open", in which the incident light participates in the image, or a position referred to as "closed", in which the incident light does not participate in the image displayed. Thus, an image is composed that depends on the open pixels. Laser scanning may also be used as means for formation of images.

There exist various types of matrices, notably the matrices of transistors of the TFT (for "Thin Film Transistor") type, which operate in light transmission mode, in other words the light beam from the sources passes through the matrix which is arranged between the light source and the optical element. The matrices of the LCOS (for "Liquid Crystal on Silicon") type and the matrices of micro-mirrors of the DMD (for "Digital Micro-Mirror Device") type are also known, which operate by reflection of the light beam toward the optical element.

An observer sees the virtual image through the optical element, the virtual image appearing on one side of the optical element, whereas the observer is situated on the other side of the optical element. In addition, the eyes of the observer must be positioned within a viewing window, commonly referred to as "eye box". The position of the viewing window is defined by the position of the virtual image with respect to the optical element. Thus, outside of this viewing window, it is not possible to see the virtual image.

To simplify, generally speaking, the display is arranged within the vehicle in the following manner: the image generator is disposed within the dashboard with a mirror that reflects the image toward the semi-reflecting optical element. The optical element is arranged on the dashboard near the windshield in such a manner as to be in the field of view of the driver.

However, the image generator must be disposed at a minimum distance from the optical element for the virtual image to be sufficiently large, given, on the one hand, that the size of the matrices is limited and, on the other hand, that the virtual image must appear at around two meters from the driver. The optical path of the image up to the optical element has, as a consequence, a minimum length. This arrangement of the display therefore occupies a fairly large space within the thickness of the dashboard.

The invention therefore aims to obtain a compact head-up display, which keeps an optical path for the image of sufficient length, and which does not require any enlargement of the image generator or modification of the optical element.

For this purpose, the invention relates to a head-up display, notably for an automobile vehicle, comprising an image generator configured for displaying an image on a display surface, a semi-reflecting optical element arranged at a distance from the image generator and configured for forming, on a first side of the optical element, a virtual image of the image of the image generator, the virtual image being visible from an eye box situated on a second side of the optical element.

The display is noteworthy in that it comprises an optical component configured for lengthening the optical path of the image passing through it going from the image generator to the optical element, the optical component comprising at least one entry face and one exit face for the image, together with a first and a second reflecting face, the first reflecting face being configured for reflecting the image from the entry face toward the second reflecting face, and the second reflecting face being configured for reflecting the image from the first reflecting face towards the exit face, the entry face being furthermore substantially in contact with the display surface of the image generator.

Thus, by virtue of the optical component, the optical path of the image between the image generator and the semi-reflecting optical element is lengthened by passing through it. The reflection faces reflect the image in such a manner that the optical path inside of the optical element is more than doubled with respect to a direct passage through the optical element.

The invention therefore allows a more compact display to be obtained because the distance between the image generator and the semi-reflecting optical element is shorter, this shortening being compensated by the optical component which allows the display to conserve the length needed for the optical path.

Furthermore, depending on the dispositions of the optical element and of its entry face and its exit face, the optical path may be oriented differently at the exit with respect to its orientation at the entry into the optical component. Thus, the image generator does not necessarily have to be placed in the axis of the semi-reflecting optical element.

According to various embodiments of the invention, which could be taken together or separately:

- the faces are ordered laterally on the periphery of the optical component in the following manner: first reflection face, entry face, exit face, and second reflection face,
- the image generator and the optical component move together,
- the image generator and the optical component are assembled by an optical adhesive bond,
- the optical component is a pentaprism comprising an additional lateral face,
- the additional face is disposed between the first and second reflecting faces,
- the display comprises mechanical means configured for moving the optical component in order to adjust the viewing window vertically,

- the mechanical means are configured for moving the optical component in order to adjust the viewing window laterally,
- the exit face forms a window for closing the display,
- the exit face has a convex or concave shape,
- the optical element is a semi-reflecting plate,
- the optical element is a part of a vehicle windshield,
- the image generator comprises at least one light source designed to emit a light beam, and a pixelization matrix configured for forming the virtual image using the light beam,
- the pixelization matrix is a matrix of thin-film transistors,
- the pixelization matrix is a matrix of micro-mirrors,
- the display comprises at least one mirror arranged in such a manner as to reflect the image of the image generator exiting from the optical component toward the optical element.

Figure 2:
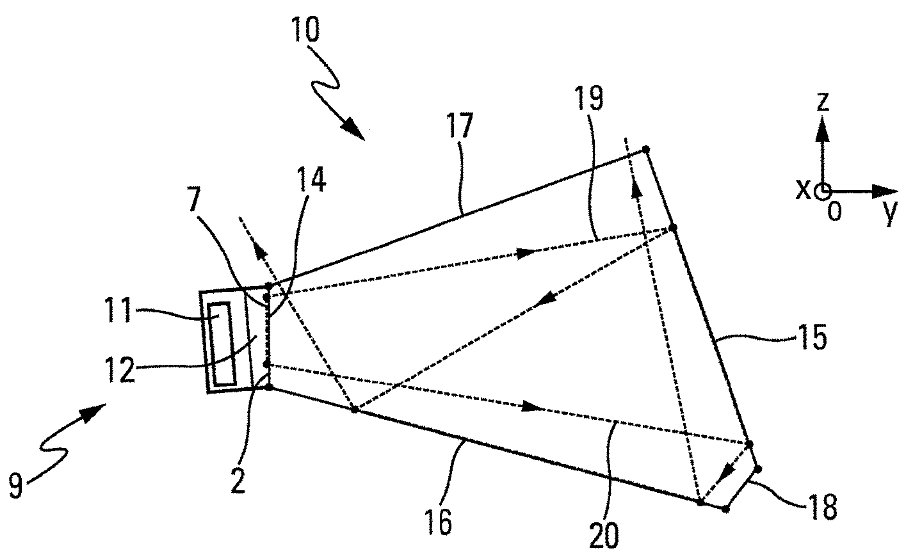
Figure 3:
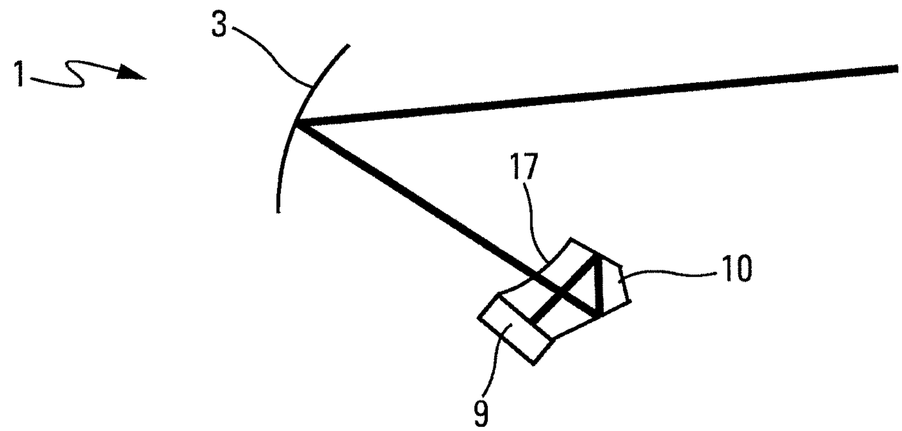

The invention will be better understood in the light of the following description which is presented only by way of example and which is not intended to limit it, accompanied by the appending drawing of the following figures:

FIG. 1, illustrating schematically one embodiment of a display according to the invention, FIG. 2, illustrating schematically a cross-sectional view of a pentaprism with the optical path of the image shown, FIG. 3, illustrating schematically a cross-sectional view of a pentaprism with a curved exit face.

FIG. 1 shows the operation of a head-up display 1, for example for an automobile vehicle. The display 1 comprises an image generator 9, configured for displaying an image 7 on a display surface 2, as can be seen in more detail in FIG. 2. The image generator 9 comprises, for example, at least one light source 11 designed to emit a light beam, and a pixelization matrix 12 configured for forming the image 7 using the light beam. The light sources 11 are for example light-emitting diodes, which are disposed in one part of the generator. The generator comprises the pixelization matrix 12, for example of the TFT type, on its exit face. Thus, the diodes emit a beam toward the matrix 12 which forms an image 7 in transmission mode on the display surface 2 of the image generator 9. The image generator 9 is for example configured for forming a substantially rectangular image.

In FIG. 1, the display 1 also comprises a semi-reflecting optical element 3 arranged at a distance from the image generator and configured so as to cause a virtual image 4 of the image 7 of the display surface 2 to appear on a first side of the optical element 3. The virtual image 4 is visible to an observer 6 if he/she looks at the optical element 3 while being placed on the other side of the optical element 3. As can be seen in FIG. 1, the image 7 is reflected in the direction of the observer 6, by a part 8 of the surface of the optical element 3. The path of the image 7 is represented by arrows 19, 20. The optical element 3 thus forms a virtual image 4 of the image 7, which appears on the first side at a certain distance from the optical element 3.

The observer 6 must be on the second side of the optical element 3, and he/she sees the virtual image 4 if their eyes are inside of a viewing window 5, also known by the term "eye box", situated on the second side of the optical element 3. The dimensions of the viewing window 5 are defined by the size and the shape of the part 8 of the surface of the optical element 3 which reflects the image 7.

The optical element 3 thus allows an observer 6 both to see the virtual image 4 and to see through the optical element 3. For an observer located on the second side of the optical element 3, the virtual image 4 is superposed, within his/her field of view, on the environment seen through the optical element 3. Here, the optical element 3 is a semi-reflecting plate.

In another embodiment of the display, used in a vehicle and which is not shown in the figures, a part of the windshield is used as a semi-reflecting optical element. For this purpose, the rest of the display is arranged within the dashboard in such a manner as to be able to use the windshield as a semi-reflecting optical element. In this case, a mirror may be arranged in the optical path of the image in such a manner as to reflect it toward the part of the windshield.

In one variant not shown in the figures, the optical element has a curve for endowing it with an optical power in order to make the virtual image appear at a certain distance from the optical element, and thus to be suitably superposed on the environment appearing in the field of view of the observer. The optical power is a physical characteristic which determines the capacity of an optical system to make light converge or diverge. It is equal to the ratio between the angle under which the eye sees the image at the exit of the system and the size of the object. The optical power therefore allows the size of the virtual image to be adjusted.

According to the invention, the display 1 comprises an optical component 10 configured for lengthening the optical path of the image 7 passing through it going from the image generator 9 to the optical element 3. Here, the optical component 10 is a pentaprism. A pentaprism comprises five lateral faces included between two parallel end faces. In the figures, the pentaprism 10 is shown in a cross-sectional view, the cross-section being parallel to the end faces such that its lateral faces 14 to 18 are shown by segments. An orthonormal reference frame (O,x,y,z) shows that the end faces and the cross-section are in the plane (yOz) and the lateral faces extend in the direction Ox.

As shown in FIG. 2, the pentaprism 10 comprises an entry face 14 for the image 7, and an exit face 17, together with a first 15 and a second 16 reflecting face. The entry face 14 of the pentaprism is substantially in contact with the display surface 2 of the image generator 9 so as to avoid optical losses. The lateral faces of the pentaprism 10 are ordered on its periphery in the following manner: the second reflection face 16, the entry face 14, the exit face 17, and the first reflection face 15. In other words, they are adjacent in that order. The pentaprism has an additional face 18 disposed between the first 15 and second 16 reflection faces.

The shape of the pentaprism 10, notably the orientation of the lateral faces with respect to one another, is furthermore optimized so as to minimize the space occupied by the pentaprism.

The image 7 of the display is reflected through the entry face 14 by the first reflecting face 15, toward the second reflecting face 16. The path of the image 7 within the pentaprism 10 is shown by the arrows 19 and 20 which represent two ends of the image. The second reflecting face 16 subsequently reflects the image 7 reflected by the first reflecting face 15 toward the exit face 17.

In order to adjust the position of the viewing window 5, the display 1 comprises mechanical means 13 configured for moving the pentaprism 10. As indicated by an arrow 21, the mechanical means 13 act on the pentaprism 10, for example by making it rotate about at least one axis. The movement of the prism modifies the direction of exit of the image received by the semi-reflecting plate 3, and changes the part 8 of the surface that reflects the image 7 in the direction of the observer 6. Thus, the viewing window 5 can be adjusted, for example vertically (along the axis Oz), but also laterally (along the axis Ox), if the mechanical means 13 allow the pentaprism 10 to be moved in two directions.

Furthermore, the image generator 9 and the pentaprism move together, in such a manner that the image 7 of the image generator 9 is always correctly oriented with respect to the entry face 14 of the pentaprism 10, and so that the movement is not to the detriment of the quality of the transmission of the image. The image generator 9 is for example fixed to the pentaprism 10 by means of an optical adhesive bond with a suitable index of refraction and which furthermore allows spurious reflections to be limited.

In one embodiment shown in FIG. 3, the exit face 17 of the pentaprism forms a window for closing the display. A closing window is notably used to protect certain elements of the display from the outside. Thus, when a display according to the invention is arranged in a vehicle, the image generator 9 and the pentaprism 10 are inserted inside of the dashboard. The dashboard has a hole so that the image transmitted by the pentaprism 10 reaches the semi-reflecting plate. In the known devices, a specific closing window closes this hole. In this embodiment, the pentaprism directly closes the hole by its exit face 17.

In order to meet the mechanical constraints required for a closing window, the exit face 17 has a convex or concave shape, such as illustrated in FIG. 3. Indeed, a closing window requires a significant mechanical strength. In addition, these curvatures can also have an optical correction function for the image, if this is needed.

The invention claimed is:

1. A compact head-up display for an automobile vehicle, comprising:

an image generator configured for displaying an image on a display surface;

a semi-reflecting optical element arranged at a distance from the image generator and configured for forming, on a first side of the optical element, a virtual image of the image of the image generator, the virtual image being visible from a viewing window situated on a second side of the optical element, wherein the display comprises an optical component configured for lengthening the optical path of the image passing through it going from the image generator to the optical element, the optical component comprising at least one entry face and one exit face for the image, together with a first reflecting face and a second reflecting face, the first reflecting face being configured for reflecting the image from the entry face toward the second reflecting face, and the second reflecting face being configured for reflecting the image from the first reflecting face toward the exit face, the entry face being further in contact with the display surface of the image generator.

2. The display as claimed in claim 1, wherein the optical component is configured in such a manner that the faces are ordered laterally on the periphery of the optical element in the following manner: second reflection face, entry face, exit face, and first reflection face.

3. The display as claimed in claim 1, wherein the image generator and the optical component move together.

4. The display as claimed in claim 3, wherein the image generator and the optical component are assembled by an optical adhesive bond.

5. The display as claimed in claim 1, wherein the optical component is a pentaprism comprising an additional lateral face.

6. The display as claimed in claim 5, wherein the additional face is disposed between the first and second reflecting faces.

7. The display as claimed in claim 1, further comprising mechanical means configured for moving the optical component to adjust the viewing window vertically.

8. The display as claimed in claim 7, wherein the mechanical means are configured for moving the optical component to adjust the viewing window laterally.

9. The display as claimed in claim 1, wherein the exit face forms a window for closing the display.

10. The display as claimed in claim 9, wherein the exit face has a convex shape.

11. The display as claimed in claim 9, wherein the exit face has a concave shape.

12. The display as claimed in claim 1, wherein the optical element is a semi-reflecting plate.

13. The display as claimed in claim 1, wherein the image generator comprises at least one light source designed to emit a light beam, and a pixelization matrix configured for forming the virtual image using the light beam.

* * * * *